(12) United States Patent
Ariesen et al.

(10) Patent No.: US 9,923,319 B2
(45) Date of Patent: Mar. 20, 2018

(54) CABLE TELEVISION CABLE TAP DEVICE

(71) Applicant: Technetix B.V., Veenendaal (NL)

(72) Inventors: Jan Ariesen, Veenendaal (NL); Gerrit Boskaljon, Veenendaal (NL)

(73) Assignee: Technetix B.V., Veenendaal (NL)

( * ) Notice: Subject to any disclaimer, the term of this patent is extended or adjusted under 35 U.S.C. 154(b) by 0 days.

(21) Appl. No.: 14/612,510

(22) Filed: Feb. 3, 2015

(65) Prior Publication Data
US 2015/0236460 A1    Aug. 20, 2015

(30) Foreign Application Priority Data

Feb. 17, 2014   (GB) .................................... 1402729.6

(51) Int. Cl.
| | |
|---|---|
| *H04N 7/16* | (2011.01) |
| *H01R 25/00* | (2006.01) |
| *H04H 20/78* | (2008.01) |
| *H04N 5/38* | (2006.01) |
| *H04N 7/10* | (2006.01) |
| *H04N 21/226* | (2011.01) |
| *H04H 20/63* | (2008.01) |

(52) U.S. Cl.
CPC .......... *H01R 25/003* (2013.01); *H04H 20/63* (2013.01); *H04H 20/78* (2013.01); *H04N 5/38* (2013.01); *H04N 7/104* (2013.01); *H04N 21/226* (2013.01)

(58) Field of Classification Search
CPC ..... H04N 7/102; H04N 7/104; H04N 7/17309
USPC ................. 725/120–121, 127–128, 148–149
See application file for complete search history.

(56) References Cited

U.S. PATENT DOCUMENTS

| | | | | |
|---|---|---|---|---|
| 5,029,958 A * | 7/1991 | Hodge | ................. | G02B 6/4201 385/100 |
| 5,371,491 A * | 12/1994 | Wu | ...................... | G08B 21/182 340/622 |
| 5,677,578 A * | 10/1997 | Tang | .................... | H01R 9/0509 307/119 |
| 6,042,365 A * | 3/2000 | Chen | ...................... | F23N 5/082 431/12 |
| 6,047,159 A * | 4/2000 | Powell | ..................... | H04N 7/22 398/1 |
| 6,188,684 B1 * | 2/2001 | Setoyama | .......... | H04B 7/18523 348/E7.07 |

(Continued)

FOREIGN PATENT DOCUMENTS

| | | |
|---|---|---|
| EP | 1829208 A2 | 10/2005 |
| WO | WO 2005/091980 | 10/2005 |

OTHER PUBLICATIONS

Search Report issued in connection with United Kingdom Patent Application No. GB1402729.6, 1 page, United Kingdom Intellectual Property Office, Aug. 4, 2014.

*Primary Examiner* — Annan Shang
(74) *Attorney, Agent, or Firm* — Dascenzo Intellectual Property Law, P.C.

(57) ABSTRACT

There is provided a cable television (CATV) cable tap device comprising a cable tap unit having a front section with electrical circuitry connected to a plurality of tap ports and a rear section connectable to a broadband network, wherein an amplifier unit is disposed between the front section and the rear section and is in electrical communication with both the front section and the rear section. The amplifier unit is a separate module and comprises one or more amplification circuits for upstream and/or downstream amplification of signals.

12 Claims, 3 Drawing Sheets

(56) References Cited

U.S. PATENT DOCUMENTS

| | | | | |
|---|---|---|---|---|
| 6,292,371 B1* | 9/2001 | Toner, Jr. | H01R 25/006 | 174/541 |
| 6,293,944 B1* | 9/2001 | Ellman | A61B 18/148 | 128/898 |
| 6,356,973 B1* | 3/2002 | McLaughlin | G11C 19/00 | 348/E7.024 |
| 6,629,048 B1* | 9/2003 | Law | G01R 1/067 | 702/57 |
| 6,647,159 B1* | 11/2003 | Satorius | B82Y 20/00 | 359/305 |
| 6,648,652 B2* | 11/2003 | Nakano | H05K 1/116 | 174/117 F |
| 6,822,972 B1* | 11/2004 | Farhan | H04B 10/275 | 348/E7.07 |
| 7,039,317 B2* | 5/2006 | McGregor | H04L 12/2801 | 370/352 |
| 9,635,324 B2* | 4/2017 | Wachob | H04N 7/22 | |
| 2002/0059634 A1* | 5/2002 | Terry | H04L 12/2801 | 725/111 |
| 2003/0157885 A1* | 8/2003 | Lukkarila | H04B 3/36 | 455/11.1 |
| 2004/0233852 A1* | 11/2004 | Ochi | H04H 60/04 | 370/242 |
| 2005/0094359 A1* | 5/2005 | Lee | G02B 6/4452 | 361/679.4 |
| 2006/0248567 A1* | 11/2006 | Vanderhoff | H04L 12/2801 | 725/128 |
| 2007/0063790 A1* | 3/2007 | Strull | H03H 7/482 | 333/109 |
| 2008/0222683 A1* | 9/2008 | Deleu | H04N 17/00 | 725/78 |
| 2010/0158049 A1* | 6/2010 | Howard | H04N 7/22 | 370/480 |
| 2012/0110631 A1* | 5/2012 | Rakib | H04L 12/2801 | 725/127 |

* cited by examiner

CABLE TELEVISION CABLE TAP DEVICE

RELATED APPLICATION

The present application claims priority to United Kingdom Patent Application No. 1402729.6, filed on Feb. 17, 2014, the complete disclosure of which is incorporated herein by reference.

FIELD

The present disclosure relates to a cable television cable tap device for use in the distribution of communication signals from a cable network to a number of network subscribers.

BACKGROUND

Cable taps are used to connect a number of subscribers in a local area into a cable television (CATV) network. A CATV network consists of interconnected coaxial cables and components such as repeating amplifiers, signal splitters, signal combiners, cable taps and other signal conveying devices to achieve two-way communication of signals between a network provider based at a "head-end" to a subscriber. Downstream signals from the provider to the subscriber are high frequency, typically within the frequency range 54-1002 MHz with return, or upstream, signals from the subscriber to the head-end in a non-overlapping frequency band, typically 5-42 MHz. In the CATV network, amplifiers and cable taps are positioned so that amplifiers compensate for signal loss of the coaxial cable and passive components such as the taps located along the cable path. To increase speed of signals throughout the network, the frequency range or bandwidth of signals can be increased. However, as higher frequencies are sent over the coaxial cable, the loss characteristics of components and the insertion loss of the coaxial cable alter producing more signal loss or less signal gain at higher frequencies.

To compensate for increased loss, the spacing of amplifiers along the coaxial cable needs to be reduced. This is very labour intensive to achieve and increases capital costs as the number of amplifiers needed throughout the network is increased.

SUMMARY

Cable television (CATV) cable tap devices and amplifier units therefor are disclosed herein. Cable tap devices according to the present disclosure include a cable tap unit having a front section with electrical circuitry connected to a plurality of tap ports and a rear section connectable to a broadband network. An amplifier unit is disposed between the front section and the rear section and is in electrical communication with both the front section and the rear section. Amplifier units according to the present disclosure are adapted to be fitted between and in electrical communication with both a front section and a rear section of a cable tap unit, the front section having electrical circuitry connected to a plurality of tap ports, and the rear section being connectable to a broadband network.

DESCRIPTION

Figure 1:
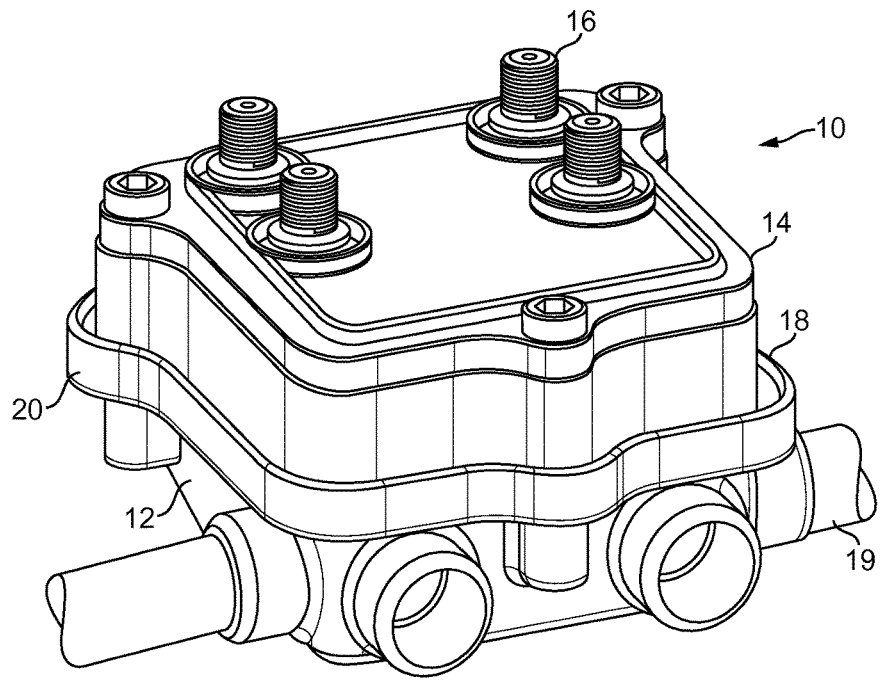
FIG. 1 is a perspective view of a cable tap device in accordance with the present disclosure.

In accordance with one aspect of the present disclosure, there is provided a cable television (CATV) cable tap device comprising a cable tap unit having a front section with electrical circuitry connected to a plurality of tap ports, and otherwise known as a face plate, and a rear section, typically known as a back-box, connectable to a broadband network, wherein an amplifier unit is disposed between the front section and the rear section and is in electrical communication with both the front section and the rear section. By having an amplifier unit disposed between the face plate and the back-box, it is possible to modify existing cable taps to compensate for signal losses at higher frequencies required to increase bandwidth.

The amplifier unit may be a separate module insertable between the front section and the rear section so that existing cable tap units, whether in situ within a network or prior to an installation, can be modified with the amplifier unit to compensate for signal loss. By having a separate amplifier module, cable tap units can be modified as required for a specific network installation, so avoiding the need to manufacture bespoke cable tap units dependent on expected losses in a network. By having a separate amplifier module, tap units can be modified as and when required to compensate for changes in loss characteristics in a network.

In some examples, the front section, rear section and amplifier unit are each separate modules. This allows them to be selectively connected together as required. By having an amplifier unit which is separate from and separable from the front section and the rear section, the signal response characteristics of the cable tap unit can be readily modified by introducing the amplifier unit when needed and routing signal transmission paths between a base plate and the face plate through the amplifier unit.

In some examples, the back-box is connectable to a signal transfer cable, such as a coaxial cable forming the main cable of a network.

The front section, rear section and amplifier unit may be provided with cooperating formations to assist with securing the three modules together. In such examples the amplifier unit may be formed with a complementary cross-section to the front and rear sections. This ensures that an assembled cable tap device with front section, rear section and amplifier unit forms a composite whole.

The amplifier unit may include amplification circuits for upstream and/or downstream amplification of signals. If required, an equaliser can be included within the amplification circuit.

If desired, amplification may be provided in the downstream path between the signal transmission path from the rear plate to the front section. If required, amplification may also be provided in the upstream signal communication path from the front section to the rear section.

In accordance with another aspect of the present disclosure, there is also provided an amplifier unit adapted to be fitted between a front section and a rear section of a cable tap unit, with preferred features as discussed above.

FIG. 1 shows a cable tap device 10 which comprises a rear section being a back plate or back-box 12 connected to face plate 14 having a plurality of cable taps or tap ports 16, with amplifier ring or unit 18 disposed between back-box 12 and face plate 14 to provide additional signal amplification. In use within a CATV network, signals sent along a main cable 19 routed through back-box 12 are accessed by users connected to tap ports 16 by drop cables.

Amplifier ring 18 is an aluminium housing shaped to match the edge profile of face plate 14 and to sit within lip 20 formed by an edge of back-box 12. As will be seen in the exploded view of FIG. 2, ring amplifier unit 18 is provided with cylindrical channels within its walls positioned to match channels in face plate 14 and base plate 12. This allows screws 22 to pass through face plate 14, amplifier ring unit 18 and into back-box 12 to secure the three separate modules together. Typically the back-box and face plate modules are sold together as a cable tap, usually an outdoor tap, with the amplifier unit 18 available for retro-fitting when, for example, noise levels within the network become such that signals cannot be supported and further amplification is required. By having a self-contained amplifier unit that can be positioned between the face plate and the back-box, the amplifier unit can be used to increase the signal level and so allow the signal transfer characteristics associated with a cable tap unit to be upgraded as and when required without the need to replace or re-site the tap unit.

Figure 3:
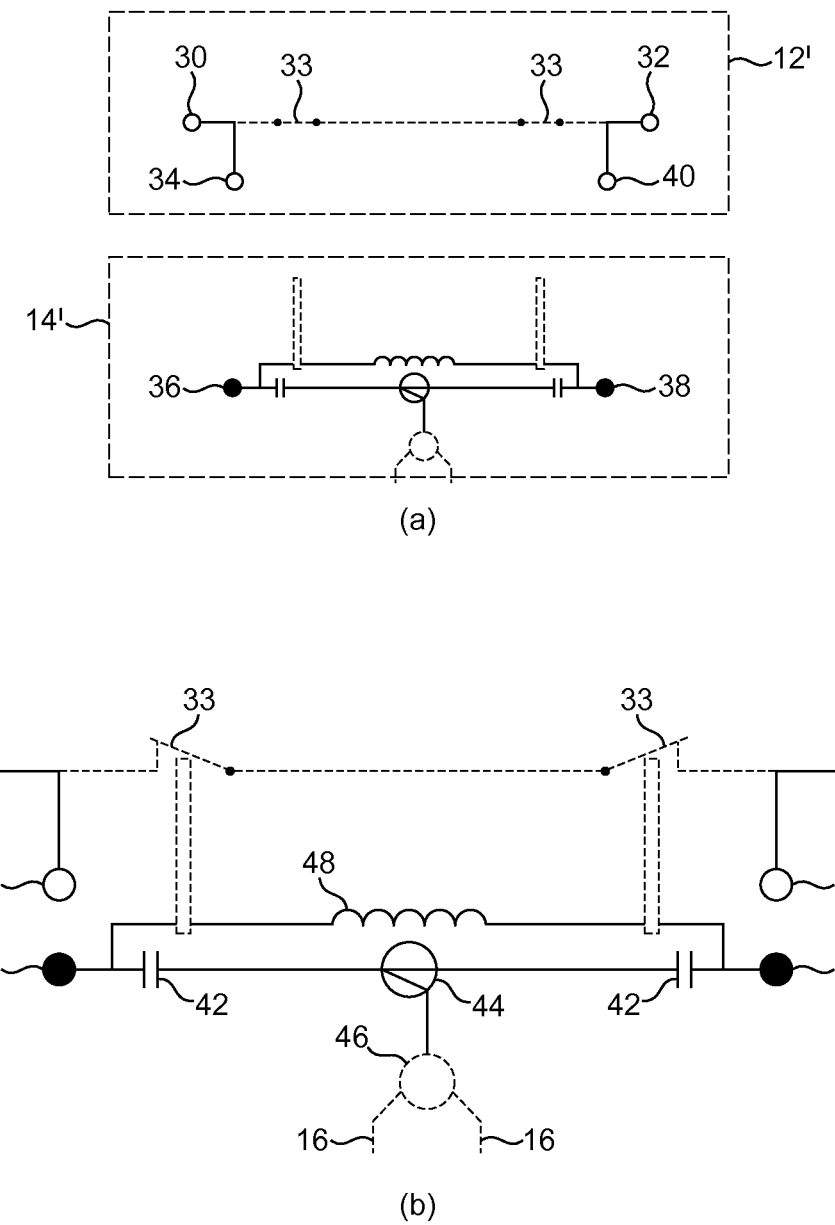
FIG. 3 is a schematic diagram of electrical connections in a prior art cable tap unit.

A schematic of electrical connections between back-box 12' and face plate 14' of a prior art tap unit is shown in FIGS. 3(a) and (b). Switch 33 is an optional feature which is not always provided in back-boxes. If the face plate and back-box are separate and unconnected as shown in FIG. 3(a), switch 33 is responsive to the attachment of face plate 14' to break the signal path between input 30 and output 32, the signal simply passing through the back-box 12' to output connector 32.

When back-box 12' and face plate 14' are connected together as in FIG. 3(b), signals pass from input 30 to internal connector 34 of the back-box. Connector 36 of face plate 14' connects to connector 34 and output connector 38 of face plate 14' connects to a second internal connector 40 of back-box 12' to establish a signal communication path from back-box 12' through face plate 14' and back to output 32 of back-box 12'. Face plate 14' includes electrical components such as capacitors 42, inductor 48, splitter 44 and tap 46 leading to tap ports 16 with the output 38 connected to internal connector 40 for output along the main signal line attached to back-box 12' at output 32. As is well known in the art, such a cable tap provides a bidirectional signal path allowing upstream and downstream signals to pass between a head-end associated with a network provider and a subscriber.

Figure 2:
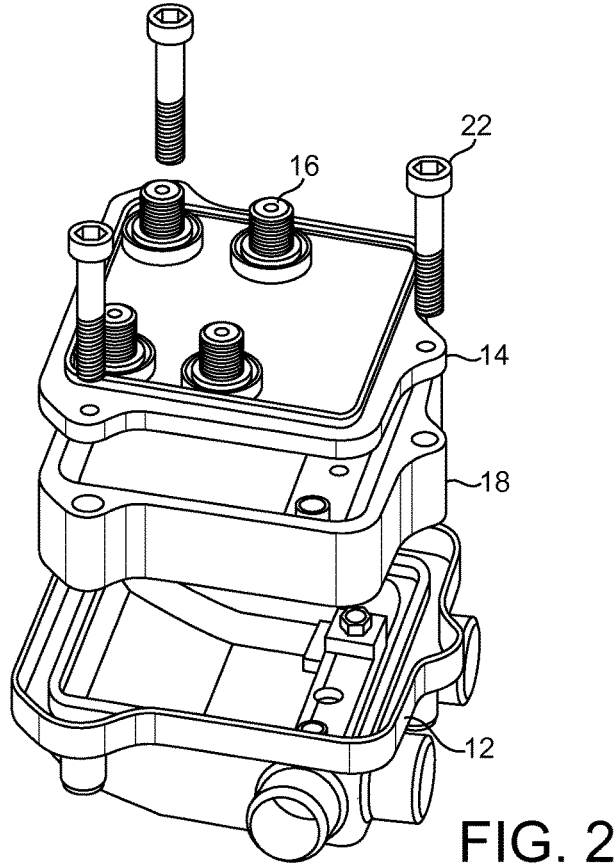
FIG. 2 is an exploded view of the cable tap device.
Figure 4:
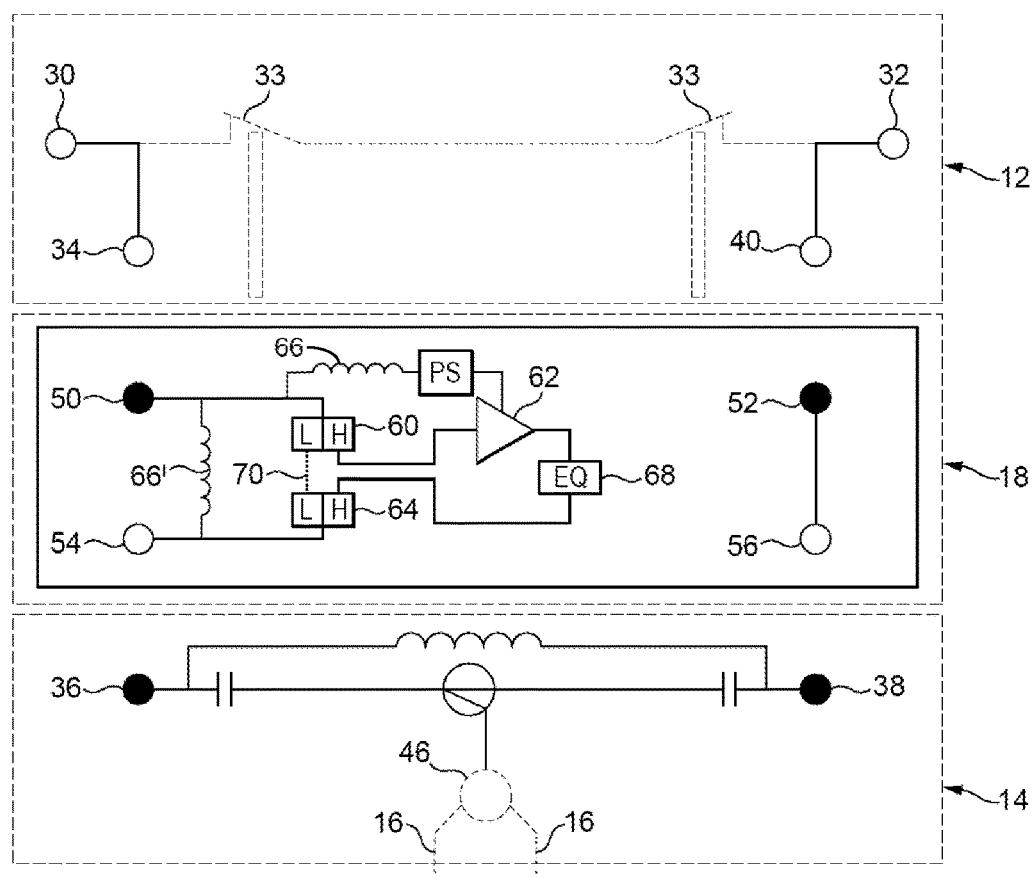
FIG. 4 is a schematic diagram to illustrate electrical connections in the cable tap device shown in FIGS. 1 and 2.

FIG. 4 shows a schematic electrical diagram of the cable tap device of FIGS. 1 and 2. Optional switch 33 is shown although the arrangement can be implemented without this feature. Amplifier unit 18 is positioned between back-box 12 and face plate 14 such that electrical communication between back-box 12 and face plate 14 is only possible through the intermediate amplifier module 18.

Amplifier unit 18 is shown with one amplifier circuit for the downstream signal. Diplex filter 60 separates out the downstream signal for amplification by amplifier chip 62, the amplified signal being recombined with the remainder of the signal by second diplex filter 64 prior to output. Typically inductors 66, 66' will be included and if required equaliser 68 can be included in the signal path from amplifier chip 62 to second diplex filter 64.

As an alternative, upstream signals can be amplified as shown by dotted line 70. If desired, a second amplifier circuit can be provided between connectors 52 and 56 for downstream and/or upstream signals.

Internal connectors 34, 40 of back-box 12 electrically connect to connectors 50, 52 respectively of module 18, with signals routed through amplifier circuitry within module 18 before being passed to face plate 14 by connectors 54, 56 connecting to face plate connectors 36, 38 respectively. In this way a physically separate amplifier module is provided which enables the amplification associated with the tap unit to be modified dependent on the signal transmission characteristics, and in particular signal noise, of a network. The amplifier module can be retrofitted into existing tap modules to compensate for increased noise in networks as bandwidth increases.

The invention claimed is:

1. A cable television (CATV) cable tap device consisting essentially of:
    a front section consisting essentially of a face plate, a plurality of tap ports extending from the face plate, and electrical circuitry connected to the plurality of tap ports;
    a rear section connectable to a broadband network and consisting essentially of a back-box, wherein the rear section is connectable to a signal transfer cable; and
    an amplifier module removably disposed directly between and engaged with the front section and the rear section, wherein the amplifier module is in electrical communication with both the front section and the rear section and routes signal transmission paths between the front section and the rear section, and wherein the amplifier module comprises one or more amplification circuits within the signal transmission paths for upstream and/or downstream amplification of signals;
    wherein the amplifier module is a separate module from the front section and the rear section, and wherein the amplifier module is configured to be selectively removed and replaced with a distinct amplifier module with distinct amplification circuits to modify the cable tap device and its signal response characteristics for a specific network installation.

2. The cable television (CATV) cable tap device according to claim 1, wherein the face plate, the back-box and the amplifier module are provided with co-operating formations.

3. The cable television (CATV) cable tap device according to claim 1, wherein the amplifier module is formed with a complementary cross-section to the face plate and the back-box.

4. The cable television (CATV) cable tap device according to claim 1, wherein an equaliser is included within the one or more amplification circuits.

5. The cable television (CATV) cable tap device according to claim 1, wherein the amplifier module is shaped to match an edge profile of the face plate.

6. The cable television (CATV) cable tap device according to claim 5, wherein the back-box has a lip formed by an edge of the back-box, and wherein the amplifier module is shaped to match and sit within the lip.

7. The cable television (CATV) cable tap device according to claim 6, wherein the edge profile of the face plate is shaped to match and sit within the lip when the amplifier module is removed from between the front section and the rear section.

8. An amplifier module adapted to be selectively fitted directly between, to be directly engaged with, and to be in electrical communication with both a front section and a rear section of a cable tap device and to route signal transmission paths between the front section and the rear section of the cable tap device, to selectively modify signal characteristics of the cable tap device for a specific network installation; the front section consisting essentially of a face plate having an edge profile, a plurality of tap ports extending from the face plate, and electrical circuitry connected to the plurality of tap ports; and the rear section being connectable to a broadband network and consisting essentially of a back-box having a lip formed by an edge of the back-box; wherein:

the amplifier module is shaped to match the edge profile of the face plate and to sit within the lip of the back-box; and the amplifier module comprises one or more amplification circuits within the signal transmission paths for upstream and/or downstream amplification of signals between the front section and the rear section.

9. The amplifier module according to claim 8, further comprising formations adapted to co-operate with formations on the cable tap device.

10. The amplifier module according to claim 8, wherein the amplifier module is formed with a complementary cross-section to the front and rear sections.

11. The amplifier module according to claim 8, wherein an equaliser is included within the one or more amplification circuits.

12. A cable television (CATV) cable tap device, comprising:

a front section consisting essentially of a face plate, a plurality of tap ports extending from the face plate, and electrical circuitry connected to the plurality of tap ports;

a rear section connectable to a broadband network and comprising a back-box, wherein the rear section is connectable to a signal transfer cable; and an amplifier module removably disposed directly between and engaged with the front section and the rear section, wherein the amplifier module is in electrical communication with both the front section and the rear section and routes signal transmission paths between the front section and the rear section, and wherein the amplifier module comprises one or more amplification circuits within the signal transmission paths for upstream and/ or downstream amplification of signals;

wherein the amplifier module is a separate module from the front section and the rear section, and wherein the amplifier module is configured to be selectively removed and replaced with a distinct amplifier module with distinct amplification circuits to modify the cable tap device and its signal response characteristics for a specific network installation.

* * * * *